(12) United States Patent
Tse et al.

(10) Patent No.: US 9,032,420 B2
(45) Date of Patent: *May 12, 2015

(54) METHOD AND MANAGEMENT AGENT FOR EVENT NOTIFICATIONS CORRELATION

(75) Inventors: Edwin Tse, Montreal (CA); Robert Petersen, Linkoping (SE); John Power, Kilmacthomas (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/269,898

(22) Filed: Oct. 10, 2011

(65) Prior Publication Data

US 2012/0079024 A1    Mar. 29, 2012

Related U.S. Application Data (63) Continuation of application No. 11/290,597, filed on Dec. 1, 2005, now Pat. No. 8,069,452.

(51) Int. Cl.
*G06F 9/54* (2006.01)
*H04L 12/24* (2006.01)
*H04L 29/00* (2006.01)

(52) U.S. Cl.
CPC .......... *H04L 41/0631* (2013.01); *H04L 41/042* (2013.01); *H04L 41/069* (2013.01)

(58) Field of Classification Search
USPC ............................................ 719/318; 726/22
See application file for complete search history.

(56) References Cited

U.S. PATENT DOCUMENTS

| | | | |
|---|---|---|---|
| 6,000,045 A | 12/1999 | Lewis | |
| 6,564,341 B1 * | 5/2003 | Sundaram et al. | 714/43 |
| 6,665,262 B1 | 12/2003 | Lindskog et al. | |
| 7,254,815 B2 * | 8/2007 | Laschkewitsch et al. | 719/318 |
| 7,343,301 B1 * | 3/2008 | Nash et al. | 705/1.1 |
| 7,376,969 B1 * | 5/2008 | Njemanze et al. | 726/22 |
| 7,788,722 B1 * | 8/2010 | Njemanze et al. | 726/23 |
| 2001/0013107 A1 | 8/2001 | Lewis | |

(Continued)

FOREIGN PATENT DOCUMENTS

| | | |
|---|---|---|
| WO | 99/49474 A1 | 9/1999 |
| WO | 00/72183 A3 | 11/2000 |
| WO | 01/84285 A2 | 11/2001 |

OTHER PUBLICATIONS

Michael Post et al., The Manager/Agency paradigm for distributed network management, IEEE Network Operations and Management Symposium, Apr. 15-19, 1996, pp. 44-53.

(Continued)

*Primary Examiner* — Brain W Wathen
*Assistant Examiner* — Abdou Seye
(74) *Attorney, Agent, or Firm* — Murphy, Bilak & Homiller, PLLC (57) ABSTRACT

Methods and apparatus for correlating event notifications between agents in a management network are provided. An agent constructs a network notification in response to receiving an event notification. If the received event notification is associated with a prior notification already received and stored by the agent, a correlation attribute is added to the constructed network notification. If the received notification matches a peer agent notification category that another agent in the management network is interested in receiving, the constructed network notification is sent to the other agent.

11 Claims, 5 Drawing Sheets

(56) References Cited

U.S. PATENT DOCUMENTS

2002/0026506 A1 2/2002 Herrmann et al.
2003/0105801 A1* 6/2003 Tse et al. ................. 709/202

OTHER PUBLICATIONS

Mercedes Garijo et al., A multiagent system for cooperative network-fault management. Proceedings of the international conference on the practical application of intelligent agents and multi-agent technology, Apr. 22, 1996, pp. 279-294.
3GPP, 3rd Generation Partnership Project; Technical Specification Group Services and System Aspects; 3G Telecom Management Principles and High Level Requirements (Release 1999); 3G TS 32.101 V3.1.1. (Mar. 2000), pp. 1-36.

* cited by examiner

METHOD AND MANAGEMENT AGENT FOR EVENT NOTIFICATIONS CORRELATION

This application is a continuation application of U.S. patent application Ser. No. 11/290,597 and has all priority and filing dates of the parent application.

BACKGROUND OF THE INVENTION

1. Field of the Invention

The present invention relates to a method and management agent for event notifications correlation.

2. Description of the Related Art

A large telecommunication management network includes various types of Network Resources (NRs). NRs may include communications nodes that insure the service provision to network subscribers, such as for example in the case of a cellular telecommunications network. Such a network may include nodes like Mobile Switching Centers (MSCs), Base Station Controllers (BSCs), Base Stations (BSs), Packet Data Service Nodes (PDSNs), Home Location Registers (HLRs), Home Agents (HAs) and the like, which are viewed as NRs from the perspective of the telecommunication management network. The later exercises supervision, monitoring, and control on its NRs. Within the management network, the NRs are represented by a set of software objects called Management Objects (MOs), which are maintained using various network management applications.

The use of software objects (i.e. of the MO instances) to represent the NRs for large networks management is a key characteristics of modern network management paradigms such as those advanced by the Telecommunication management network (TMN) of the International Telecommunication Union-Telecommunication Standardization Sector (ITU-T) and by the $3^{rd}$ Generation Partnership Project (3GPP) Integration Reference Point framework for 3G wireless networks.

In a large telecommunication management network, there is a distinction between one type of application called manager and another type of application called agent. In general, the agent manages the NRs on behalf of managers, i.e. the managers do not directly interact with the NRs. Rather, the managers control the NRs by sending instructions to agents, that in turns control the NRs. In such a context, the agent typically has a Management Information Base (MIB), called agent-MIB, which is a collection of MOs (including their attributes) representing all NRs under management of that agent. Each manager also has a MIB, called manager-MIS that holds this particular manager's perspective or knowledge about the NRs under its management in the form of MOs as well.

Accordingly, the principle that in large telecommunication networks the manager does not interact directly with the NRs, but rather with one or more agents linked to a set of NRs is widely used and well documented in the telecommunications industry.

One key element of the modem telecommunication network management is for agents to report and for managers to timely receive network event notifications (also called herein notifications or alarm notifications), such as occurrences of NR state changes and NR alarms. Reception of network events by managers allow managers to have the current view of the state of affairs of the network so that they can perform analysis, such as network alarm root cause identification, network traffic trends, etc.

The way managers receive the network events is typically as follows. One agent is responsible for the management of a group of NRs. Each agent is responsible to report state changes of its managed NRs in a form of event notifications and maintains a notification log and an Active Alarm List (AAL). The log tracks all notifications that are emitted toward the manager, while the ML tracks all notifications carrying active alarm information received from NRs. Active alarm notifications are defined as alarm notifications that are not yet cleared and not yet acknowledged by the manager. The manager can pull/read the contents of the log and of the ML whenever it needs. Each agent may send notifications of its managed NRs to multiple managers.

In prior art implementations, agents emit notifications to report NR state changes solely to their corresponding managers. Agents do not report these notifications to other peer agents. Network state changes reported in these notifications may be caused by a certain event of a network node (e.g. a software module of a network node has restarted) or network link (e.g. cable is cut). More importantly, the occurrence of an event of a network node or network link normally affects multiple NR states.

Since each agent is reporting its own notifications to its corresponding manager and not to its peer agents, the notifications of various agents are never correlated at the agents level, i.e. the information contained in one notification from one agent cannot indicate that it is related to another notification of another agent, even if the notifications are caused by the same network event. As a consequence, the manager has to process received notifications from various agents and perform notification correlation, which is a resource-consuming task.

Thus, today's state-of-the-art solutions put a heavy burden in terms of processing activity on the managers, because notifications received from an agent cannot be correlated with notifications from another agent before they are received in the manager. This leads to unnecessary signalling load between the agents and the manager, such as for example when multiple notifications related to the same cause are sent to the manager from multiple agents. This leads to unnecessary processing execution at the manager that may result in an overload or even a failure for the later, thus creating a hazardous situation, since in a given network, the role of a manager is critical.

Although there is no prior art solution as the one proposed hereinafter for solving the above-mentioned deficiencies, the U.S. Pat. No. 6,000,045 issued to Lewis (hereinafter called Lewis) bears some relation with the field of the present invention. In Lewis, there is disclosed the multi-domain network manager, which provides alarm correlation among a plurality of domains included in the communications network. Individual network management systems monitor single respective domain of the communications network and provide alarms indicative of status specific to the single respective domain. A multi-domain network manager receives the alarms and correlates them to provide inter-domain alarms as well as responses in the form of corrective actions. The manager provides a high level of correlation and response for the entire network. In this reference, it is solely the multi-domain manager that performs alarm correlation, while the other network entities, such as the network management systems, only function to relay the alarms from the network resources to the manager. Conclusively, Lewis' teaching is limited to a method for correlating alarms within a manager, which again puts the heavy processing burden related to alarm correlation on the manager.

SUMMARY OF THE INVENTION

Accordingly, it should be readily appreciated that in order to overcome the deficiencies and shortcomings of the existing solutions, it would be advantageous to have a method and a corresponding agent for effectively correlating notifications that originate from NRs before they reach the manager, i.e. at the agent level. The present invention provides such a method and system.

In one aspect, the present invention is a method for correlating event notifications comprising several steps. First, a first agent of a management network receives a first event notification and determines if the first event notification matches a peer agent notification category that defines a category of event notifications a second agent of the management network is interested in receiving from the first agent. Then, upon positive determination, the first agent sends the first event notification to the second agent, so that the second manager can correlate the first event notification with its own event notifications.

In another aspect, the present invention is a first agent of a management network comprising an input interface receiving a first event notification, a Peer Agent Notification Category List (PANCL) storing one or more peer agent notification categories, each being indicative of a category of event notifications that other agents are interested in receiving from the first agent, and a notifications processing engine receiving the first event notification from the input interface and determining if the first event notification matches the peer agent notification categories of the PANCL, and upon positive determination, the notifications processing engine sending the first event notification at least to a second agent associated with a matched peer agent notification category of the PANCL.

In yet another aspect, the present invention is a method for correlating event notifications that first allows for the receiving at a first agent of a management network a peer agent event notification from a peer agent. Then the method allows determining at the first agent if the peer agent event notification matches any event notifications that the first agent sent to a manager, and, upon determining that the peer agent event notification matches an event notification that the first agent sent to a manager, the method allows correlating the peer agent event notification with the event notification the first agent sent to a manager.

In yet another aspect, the present invention is a first agent of a management network, comprising an input interface receiving a peer agent event notification from a peer agent, a manager notifications log storing identities of event notifications sent from the first agent to a manager of the management network, and a notifications processing engine receiving the peer agent event notification from the input interface and determining if the received peer agent event notification matches any event notifications of the manager notifications log and, upon determining that the peer agent event notification matches an event notification of the log, correlating the peer agent event notification with the event notification of the log.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

The present invention provides a method and an agent that allows for the correlation of event notifications at the agents' level, among a plurality of agents, before such notifications reach a manager of a management network. When a given agent receives an NR notification, this agent may attempt to correlate the NR notification with other notifications received from cooperating peer agents, so that when the manager received the correlated NR notification it can easily match it with the other related notifications, without necessitating the use of extensive processing resources. Similarly, when an agent receives a notification from a cooperating peer agent, it attempts to correlate it with other notifications it knows of, that may be received either from its NRs, or from other peer agents.

Figure 1:
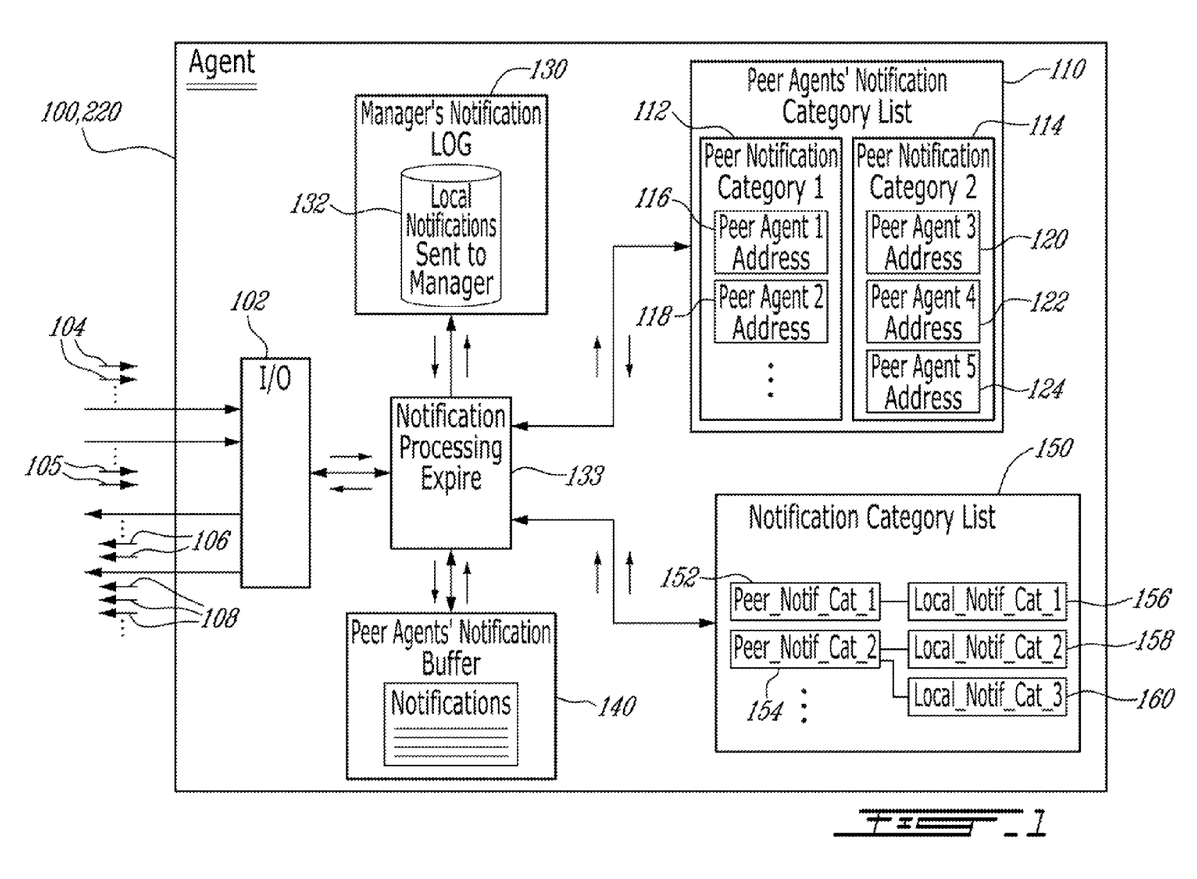
FIG. 1 is an exemplary simplified block diagram of a telecommunication node such as a management agent implementing the preferred embodiment of the present invention.

Reference is now made to FIG. 1, which shows a high-level block diagram of a network-management agent 100 that implements the preferred embodiment of the present invention. Shown in FIG. 1 is the agent 100 that comprises an input/output communications interface 102 responsible for the receipt of events notifications 104 from Network Resources (NRs) under the control of the agent 100 as well as of the receipt of event notifications 105 from other peer agents. The input/output interface relays the incoming notifications to a processing engine of the agent, which is yet to be described, and receives outgoing event notifications from the same processing engine. In the context of the present invention, by peer agents it is understood a plurality of agents that report notifications to the same manager. The input/output communications interface 102 is also responsible for the emission of the event notifications 106 and 108 to other peer agents or to a manager respectively. The agent 100 further comprises a Peer Agent Notification Category List (PANCL) 110, which contains one or more sets of peer agents' notification categories 112 and 114. A peer agent notification category may contain definition of a category of notifications (a certain type of notifications) that are also to be sent to other peer agents by the agent 100. Alternatively, a peer agent notification category may be implemented using a function with internal data structure, wherein the function input is a notification and the function output is either "matched" or "not matched". For example, a simple category can have a function "if the NR identity contained in the input notification is equal to "xyz" specified in the category's internal data structure, the output is "matched", otherwise, the output is "not matched". It is to be noted that various ways exist for defining such a peer agent notification category. Besides the definition of a notification category, each shown peer notification category 112 and 114, also comprises addresses 116-

124 of peer agents associated with each such notification category, which agents are to be notified upon receipt by agent 100 of a notification that matches a given peer agent notification category. For example, upon receipt of a notification 104, the agent 100 attempts to match the notification with the peer agent notification categories 112 and 114, and when a match is found, the agent 100 refrains from sending the received notification to its manager, but rather sends it to address 116 and 118 of the peer agents associated with the matched category.

The agent 100 further comprises a NCL 150 (Notification Correlation List) that stores one or more sets of peer notification category(s). A peer notification category is related/associated therein to one or more local notification category(s). The NCL 150 stores information about which kind of peer notifications are related to which kind of NR notifications". An agent's operator may create/initialize this data structure prior to correlation of notification.

All notifications that are transmitted from the agent 100 to the manager are also logged by the agent 100 into a manager notification log 130, which may comprise a list or database 132 that stores the sent notifications or only their identifications.

Furthermore, the agent 100 also comprises a peer agent notification buffer 140, which registers notifications 105 received by the agent 100 from other peer agents.

Finally, the agent 110/220 comprises a notifications processing engine 133 that may be implemented in the form of software module(s) running on a computer, in the form of hardware module(s), or in any suitable combination thereof. The notification processing engine 133 is connected to the log 130, to the I/O interface 102, to the PANCL 110, to the NCL 150 as well as to the buffer 140 via suitable links, and is configured to retrieve, process, and send the required information, e.g. the various described event notifications, as described in relation to FIGS. 2 and 3, which are yet to be described. Thus, it is to be understood in the forthcoming description that the actions related to the retrieve and processing of information said to be performed by the agent in relation to FIGS. 2 and 3 are performed by the notifications processing engine 133 of the agent.

Figure 2:
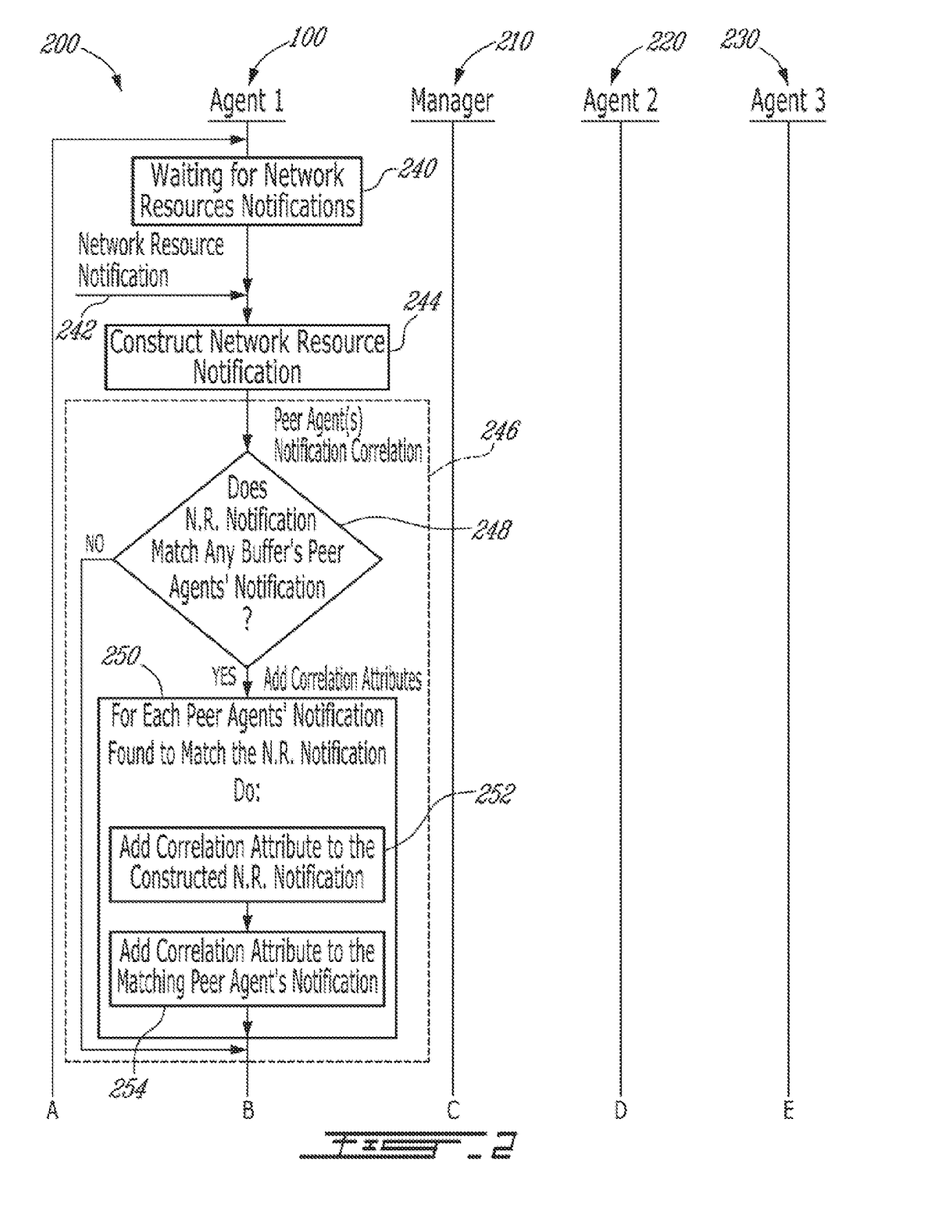
FIG. 2 is an exemplary nodal operation and signal flow diagram of a management network implementing the preferred embodiment of the present invention.
Figure 3:
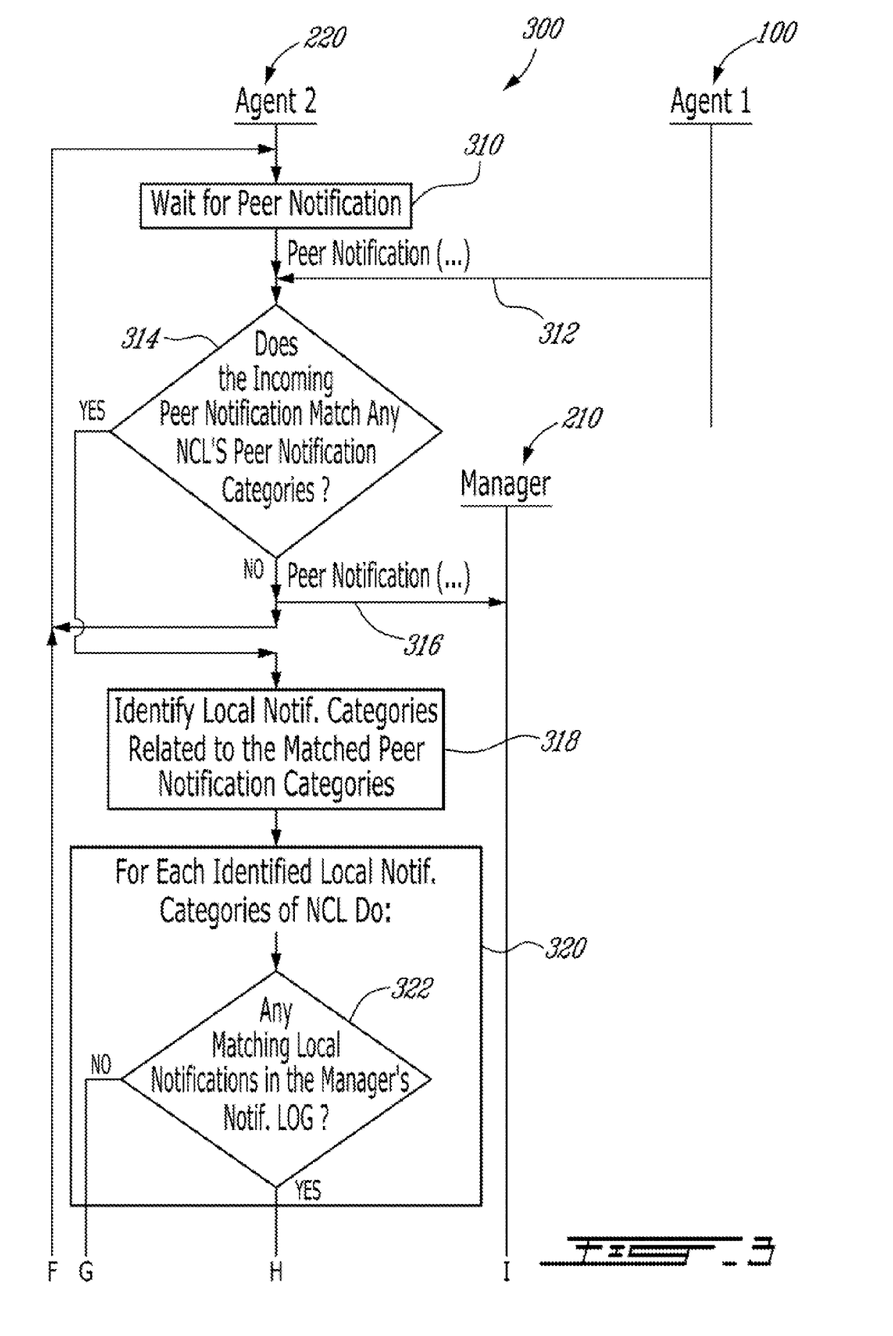
FIG. 3 is another exemplary nodal operation and signal flow diagram of a management network implementing the preferred embodiment of the present invention.

Reference is now made jointly to FIG. 1, previously described, and to FIG. 2, which is an exemplary high-level nodal operation and signal flow diagram of a management network 200 that implements the preferred embodiment of the present invention. Shown in FIG. 2 is the agent 1 100 as previously described, a manager 210 configured to receive event notifications from the agent 100, and a second and a third agent 220 and 230 respectively that are also configured to receive event notifications from their own network resources or from a peer agent such as the agent 1 100.

The agent 100 waits for the receipt of new NRs notifications, action 240. In action 242, the agent 100 receives a notification from one of the NRs via its input interface 102. In action 244, the agent 100 may construct a new NR notification that comprises all the information contained in the notification 242. Alternatively, action 244 may be skipped or may comprise creating a copy of the NR notification 242, or even the selection of the same NR notification 242 for subsequent use as described hereinafter. In action 246, the agent 100, checks to see if the NR notification (or the copy or the just constructed new notification, all of which are herein designated using the term NR notification) if the first event notification can be associated to one or more other event notifications known to the first agent. For example, the agent 100 can determine if the NR notification matches any one of the peer agents notifications of the buffer 140, and if so, identifies the related peer agent notification of the buffer 140 and adds a correlation attribute to the NR notification, to identify the matching peer notification using its notification identifier. Particularly, in action 246, the agent 100 may first determines in action 248 if the NR notification matches any of the peer agents notifications stored in the buffer 140 and, if so adds a correlation attributes to the NR notification and to the matching notifications from the buffer, action 250. Particularly, the agent 100 may act, for each one of the matching peer agents' notifications of the buffer 142, to add to the NR notification a correlation attribute that identifies the buffer's matching peer agent notifications, action 252. The agent may further optionally add to the buffer's matching peer agent notifications a correlation attribute that identifies the NR notification, action 254. The purpose of action 250 is to correlate the new notification with other notifications received from peer agents, and optionally vice-versa, before any of these notifications reach the manager 210, so that the processing burden associated with the correlation operation is reduced for the manager.

If in action 248 it is rather detected that none of the buffers peer agents notifications matches the constructed notification, action 250 is skipped.

In both cases, the method continues with action 256, where the agent 100 determines if the new notification matches any of the PANCL's peer notification categories, in order to find out if the NR notification should be sent to any one or more of the peer agents 220 and 230 related to the agent 100. If no match is found between the NR notification and the peer notification categories 112 and 114 of the PANCL 110, it is concluded that there is no peer agent that is to be notified of the new notification, and in action 258 the NR notification is sent to the manager 210 along with its correlation attribute 260 inserted in the NR notification in action 252.

Although not shown in FIG. 2, upon receipt of the notification 258 by the manager 210, the later may easily determine if the notification 258 is related to other previously received notifications, or that are to be received, using the correlation attribute 260.

Agent 100 also acts in action 262 to update its managers notifications log 130 with the notification 258 sent to the manager 210.

If in action 256 it is rather found that the new notification matches any of the PANCL's notification categories, the agent 100 further identifies the addresses of the peer agent(s) associated with the matched peer notification category, action 264. For example, in action 256, the agent 100 may determine that the NR notification matches the peer notification category 112 of the PANCL 110, and in action 264 may further identify the peer agents addresses 116 and 118 of the category 112. Finally, in actions 266 and 270, the agent 100 transmits the new notification 258 with its correlation attribute 260 to the identified addresses 116 and 118, which in the present exemplary scenario are the ones of agents 220 and 230, thus allowing these agents to attempt to correlate the new notification with other notifications that may receive from their own network resources.

Reference is now made jointly to FIG. 1, previously described, and to FIG. 3, which is a high-level nodal operation and signal flow diagram of a management network 300 that implements the preferred embodiment of the present invention. Shown in FIG. 3 is the agent 2 220 as previously described, the manager 210 configured to receive event notifications from the agent 2 220, and the agent 1 100 that is configured to send event notifications received from its own NRs to its peer agent 2 220. The agent 220 comprises an NCL 150, which stores one or more peer agent notification categories 152 and 154 that specify categories of peer agents' notifications which the agent 220 is interested of receiving. Each such peer notification category can be associated with one or more local notification categories that specify categories of NR notifications that may be received by the agent 220 directly from his own NRs (as opposed to being received from peer agents). For example, in this exemplary scenario illustrated in FIG. 1, the peer agent notification category 1 152 is associated with the local notification category 156, while the peer notification category 2 154 is associated with local notification categories 158 and 160.

In this exemplary scenario described in relation to FIG. 3, first, in action 310, the agent 220 waits for a receipt of a peer agents notification from any one of its peer agents, such as for example from agent 100. In action 312, agent 100 sends a notification to its peer agent 220. Such peer agent event notification (also called herein a peer notification or a peer agent notification) may be received in various circumstances, including but being not limited to when the agent 100 is configured to determine, upon receipt of an NR notification from one of its own NRs, that the NR notification should also be transmitted to its peer agents, such as described in relation to FIG. 2, action 256. Upon receipt of the peer notification by its input interface 102 of action 312, the agent 220 determines if the incoming peer notification matches any of the NCL peer notification categories, action 314, and in the negative, it is concluded that the peer notification cannot be used in any additional correlation with NR notifications of the agent 220, and the peer notification 312 is thus sent to the manager 210, action 316.

If it is rather detected in action 314 that the incoming peer notification 312 matches any peer notification categories from the NCL 150, the method continues with action 318 wherein the agent 220 identifies which ones of the local notification categories 156-160 from the NCL 150 are associated to the matched peer notification categories. For example, in action 314, the agent 220 may determine that the peer notification of action 312 matches the peer notification category 152, and in action 318 the agent 220 may further identify the local notification category 156 associated to the peer notification category 152.

Thereafter, for each identified local notification categories, the agent 220 determines if there are any matching logged NRs notifications registered in the manager's notifications log 130 that matches' the identified local notification category, action 322. Action 322 may also include determining if the peer agent event notification matches any event notifications identified in the log 130, which notifications were sent to the manager. In the affirmative, the agent 220 concludes that the incoming peer notification of action 312 is to be correlated with already transmitted NR notifications found to match (in the log 130), and for this purpose, the agent 220 adds to the incoming peer notification a correlation attribute that specifies the identity of the matching NR notifications from the log 130, action 324. Then, the agent 220 sends to the manager 210 the modified peer notification 326 with the correlation attribute 328, and the method returns before the action 310 so that the agent 220 again waits for the receipt of another peer notification.

If in action 322 it is rather detected that there are no logged NR notifications in the log 130 that match the identified local notification categories, the method skips actions 324-326, i.e. there is no addition of the correlation attribute and the peer notification is not sent to the manager 210 in action 326. Rather, the method continues with action 330, where the agent 220 creates a peer agent notification in the peer agent notification buffer 140, the peer agent notification comprising the same information as the peer notification received in action 312, action 330. The purpose of this buffered peer notification is to delay its emission to manager(s) in the event that during the delay, a new correlated/related peer notification or NR notification can be received at the agent 220, so that the correlated information can be added into the delayed/buffered notification before its transmission to the manager 210. When the peer agent notification is created and stored in the buffer 140, the agent 220 may also associate it with it a timer of a preset value, that defines the period of time the peer agent notification is hold in the buffer before being sent to the manager 210. Upon expiry of the timer, action 332, the agent 220 sends the peer notification to the manager 210, and in action 336 also deletes/removes the peer notification and the associated local notification category(s) from the buffer 140.

The agent 220 may further create a local notification category in the NCL 150, the category being the same as the category of the peer notification. The purpose of this creation being to insure fast discovery correlation between the buffered peer notification and new NR/peer notifications. The created local notification category is the same set as the matched peer notification category of the NCL 150.

With reference being now made jointly to FIGS. 1, 2, and 3, the agent 110/220 preferably comprises a notifications processing engine 133 that may be implemented in the form of software module(s) running on a computer, in the form of hardware module(s), or in any suitable combination thereof. The notification processing engine 133 is connected to the log 130, to the I/O interface 102, to the PANCL 110, to the NCL 150 as well as to the buffer 140 via suitable links, and is configured to retrieve, process, and send the required information, e.g. the various described notifications, as described in relation to FIGS. 2 and 3. Thus, upon reading the hereinabove description with respect to these Figures, one should understand that it is the notification processing engine 133 that may be responsible of performing the described actions.

Therefore, with the present invention it becomes possible to correlate event notifications between multiple agents before the notifications reach a given manager, thus saving the manager's processing resources for other tasks.

Based upon the foregoing, it should now be apparent to those of ordinary skills in the art that the present invention provides an advantageous solution, which offers a simple and efficient method and agent for correlating event notifications with the ones of at least one other agent. Although the system and method of the present invention have been described in particular reference to certain terminology (e.g. agents and manager), it should be realized upon reference hereto that the innovative teachings contained herein are not necessarily limited thereto and may be implemented advantageously in various types of nodes. While the method and system shown and described have been characterized as being preferred, it will be readily apparent that various changes and modifications could be made therein without departing from the scope of the invention as defined by the claims set forth hereinbelow.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method at a first agent in a management network that is one among a plurality of peer agents that report event notifications up to a common manager in the management network, said method comprising:

receiving Peer Agent (PA) notifications from one or more other ones of the peer agents in the plurality of peer agents;

receiving Network Resource (NR) notifications from one or more network resources managed by the first agent;

determining whether a correlation exists between a PA notification received at the first agent from a given second peer agent among the plurality of peer agents and a NR notification received at the first agent; and if the correlation exists, creating a modified notification, said modified notification indicating the correlation, and sending the modified notification to the manager.

2. The method of claim 1, wherein said step of determining comprises determining whether the correlation exists between the PA notification and any NR notifications received at the first agent before receipt of the PA notification.

3. The method of claim 2, wherein said step of determining further comprises determining whether the correlation exists between the PA notification and any NR notifications received at the first agent within a defined delay after receipt of the PA notification, and, if the correlation does not exist, sending the PA notification without modification to the manager after expiry of the defined delay.

4. The method of claim 1, wherein said step of determining comprises determining whether the correlation exists between the PA notification and any NR notification received at the first agent before receipt of the PA notification or within a defined delay after receipt of the PA notification, or any other PA notification received at the first agent before receipt of the PA notification or within a defined delay after receipt of the PA notification, and, if the correlation does not exist, sending the PA notification to the manager after expiry of the defined delay without modification, and, if the correlation exists, sending the modified notification to the manager after expiry of the defined delay.

5. The method of claim 1, wherein said step of determining comprises determining whether the correlation exists between the PA notification and any logged notifications indicated in a notification log maintained at the first agent, wherein the notification log indicates at least one of: previously received PA notifications, previously received NR notifications, and previously transmitted notifications, as sent from the first agent to the manager.

6. The method of claim 1, wherein the one or more network resources managed by the first agent comprise first network resources, and wherein the second peer agent manages second network resources.

7. The method of claim 1, wherein said step of determining comprises determining whether an event category of the PA notification matches or is associated with an event category of the NR notification.

8. The method of claim 7, further comprising maintaining a Peer Agent Category List (PACL) that defines associations between one or more categories of PA events and one more categories of local, NR events, and wherein said step of determining whether the event category of the PA notification matches or is associated with the event category of the NR notification comprises using the PACL at least in part to determine whether the event category of the PA notification is associated with the event category of the NR notification.

9. The method of claim 1, further comprising determining whether an event category associated with any given NR notification received at the first agent matches a category of interest known for one or more other ones of the peer agents among the plurality of peer agents and, if so, sending the given NR notification or a modified version of the given NR notification to the one or more other peer agents.

10. The method of claim 9, further comprising maintaining a Peer Agent Category List (PACL) at the first agent that defines the categories of interest for the one or more other ones of the peer agents.

11. The method of claim 9, wherein the modified version of the given NR notification indicates a correlation between the given NR notification and any PA notifications previously received at the first agent.

\* \* \* \* \*